United States Patent [19]
Hellwarth et al.

[11] 4,063,804
[45] Dec. 20, 1977

[54] OPTICAL HARMONIC MICROSCOPE ASSEMBLY AND EXAMINATION METHOD

[75] Inventors: Robert W. Hellwarth, Los Angeles; C. Paul Christensen, Jr., Venice, both of Calif.

[73] Assignee: The University of Southern California, Los Angeles, Calif.

[21] Appl. No.: 582,046

[22] Filed: May 29, 1975

[51] Int. Cl.$^2$ .............................................. G02B 21/00
[52] U.S. Cl. .................................... 350/320; 350/15; 356/30
[58] Field of Search ........................ 350/14, 15, 87, 91, 350/320; 307/88.3; 356/30, 31

[56] References Cited
U.S. PATENT DOCUMENTS

| | | | |
|---|---|---|---|
| 3,621,273 | 11/1971 | Rorden et al. ................. | 307/88.3 |
| 3,792,287 | 2/1974 | Roland et al. ................. | 307/88.3 |
| 3,918,793 | 11/1975 | Kraft ........................ | 350/91 |
| 3,975,084 | 8/1976 | Block ........................ | 350/87 X |

OTHER PUBLICATIONS

Freund, Article in *Physical Review Letters*, Nov. 4, 1968, pp. 1404–1406 cited.

*Primary Examiner*—David H. Rubin
*Attorney, Agent, or Firm*—Nilsson, Robbins, Dalgarn, Berliner, Carson & Wurst

[57] ABSTRACT

An optical harmonic microscope assembly and an examination method which provides for focusing lased coherent light as an incident beam onto a specimen, disposing the optical path of a microscope and the incident beam at a relative angle in a range which is at least as broad as 0°–90°, blocking the fundamental frequency of the lased light and viewing light of a harmonic of said fundamental frequency generated by nonlinear diffraction by said specimen.

9 Claims, 6 Drawing Figures (a)

(c) (d)

OPTICAL HARMONIC MICROSCOPE ASSEMBLY AND EXAMINATION METHOD

FIELD OF THE INVENTION

The field of art to which the invention pertains includes broadly the field of optics and, more specifically, the fields of compound microscopes, light sources therefor, filters and intercomponent relationships.

BACKGROUND AND SUMMARY OF THE INVENTION

Studies have been made of the second-harmonic generation of optical maser beams in various crystals and investigators have elucidated the theoretical considerations underlying the general phenomenon of nonlinear diffraction with respect to second and higher order harmonic generation. For an early review of the subject of second harmonic generation, see P. A. Franken and J. F. Ward, Review of Modern Physics, Vol. 35, page 23 (1963). Additionally, one can refer to the following papers for discussions of various studies which have been made of second harmonic generation of optical maser beams in various crystals: *Optical Harmonic Generation in Single Crystal BaTiO$_3$* by R. C. Miller, Physical Review, Vol. 134, page A1313 (June, 1964); *Critical Harmonic Scattering in NH$_4$Cl* by I. Freund, Physical Review Letters, Vol. 19, No. 22, page 1288 (November, 1967); and *Long-Range Order in NH$_4$Cl* by I. Freund and L. Kopf, Physical Review Letters, Vol. 24, No. 18, page 1017 (May, 1970). See, in particular, *Nonlinear Diffraction* by I. Freund, Vol. 21, No. 19, page 1404 (November, 1968) which describes experiments in which the far-field pattern of second harmonic radiation has been recorded through a filter selectively transmitting such second harmonic. Nonlinear diffraction effects are of particular significance with respect to the investigation of structure of a crystal which has a spacially uniform linear susceptibility, but with a periodic spacial modulation of the nonlinear susceptibility. With such a crystal, no diffraction of light traversing the medium occurs, but harmonic generation, and particularly intense second harmonic generation, will occur at angles of incidence and diffraction for which the nonlinear analog of Bragg's Law is satisfied. An elementary theoretical description of such effect and experimental verification is given in the above paper by I. Freund entitled "Nonlinear Diffraction".

While the foregoing effects have been observed, it would be desirable to provide a method for microscopic examination of crystals displaying nonlinear diffraction. In particular, it would be desirable to provide apparatus and a method for microscopic examination for crystals which as a result of optical isotropy show no structure under ordinary microscopes.

The present invention provides such microscope apparatus and method for examination. Specifically, an optical harmonic microscope assembly and method is provided whereby lased coherent light is focused as an incident beam onto a specimen and the optical path of the microscope assembly and the incident beam is disposed at a relative angle in a range which is at least as broad as 0°-90°. The fundamental frequency of the lased light is blocked and the light of a harmonic of the fundamental frequency is viewed through the microscope. In a specific embodiment, a lased beam of infrared light is focused on a specimen supported on a microscope stage which can be tilted relative to the optical path of the microscope in a range of 0°-180°. The green second harmonic generated by nonlinear diffraction forms the image which is viewed through a filter which blocks the infrared light.

A polarizer can be incorporated in the light path, and further, the lased light can be polarized prior to impingement onto the specimen. The result is the visual discernment of crystal structure which would not otherwise be apparent. Specifically, polarization of the harmonic image reveals details of orientation of microcrystallites that are unavailable from ordinary microscopy.

The invention will be better understood when details thereof are considered in conjunction with the appended drawings.

DETAILED DESCRIPTION

Details of the invention will be given with respect to the generation of second harmonic frequencies, but the invention is broadly applicable to the generation of any optical harmonic frequency of the lased fundamental. Furthermore, the term "laser" and "lased" and the like is used in its broadest sense to include masers generating in the frequency ranges hereinafter specified. Additionally, while a laser will be described which generates a particular frequency, it will be understood that many different laser forms can be used including multiple laser sources and the like and whereby a plurality of fundamental frequencies are generated.

Figure 1:
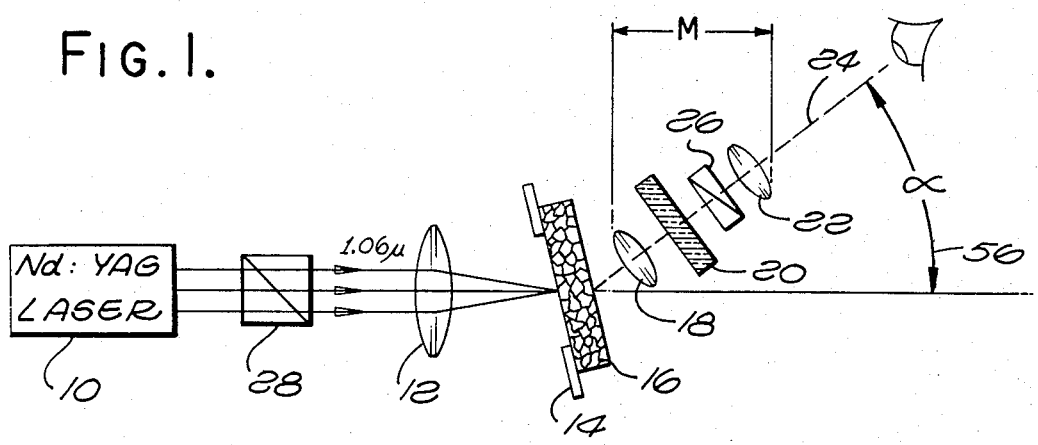
FIG. 1 is a schematic representation of an optical harmonic microscope in accordance with the present invention.

Referring to FIG. 1, an optical harmonic microscope assembly of the present invention is illustrated which includes, as the basic components, a laser 10, a focusing lens 12, a stage 14 for supporting a specimen 16, and a microscope assembly including an objective lens 18, a filter 20 blocking light of the fundamental frequency but passing the second harmonic thereof, an eyepiece 22 and a body member (not shown) defining an optical path 24 between the objective lens 18 and eyepiece 22. Additionally, there can be included a polarizer 26 disposed in the light path and means 28 for polarizing the lased light prior to impingement onto the specimen 16.

Figure 2:
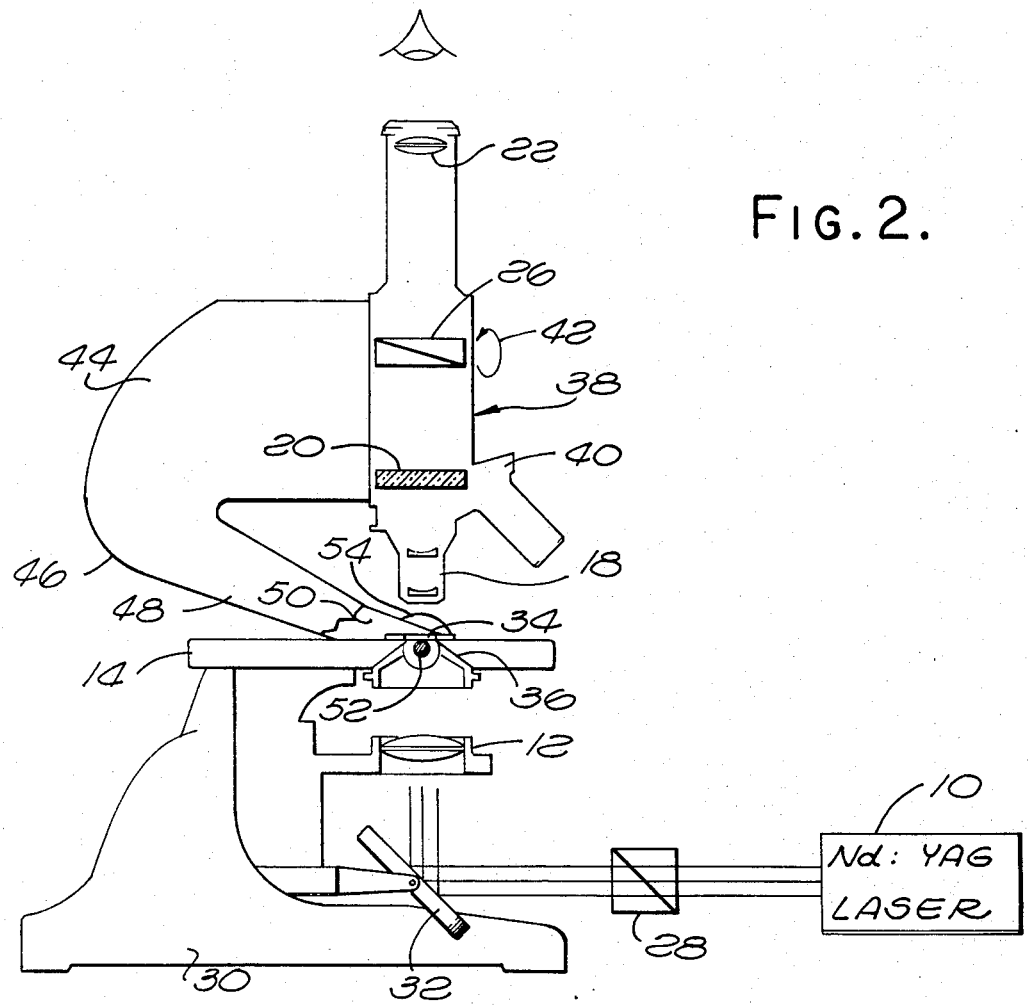
FIG. 2 shows further details of structure of the optical harmonic microscope of the present invention.

FIG. 2 discloses a specific structure incorporating the foregoing components and includes a microscope base 30 rigidly carrying the specimen stage 14 above a condenser which serves as the focusing lens 12. A flat mirror 32 is pivotally disposed beneath the condenser 12 so as to reflect light from the laser 10 upwardly through the condenser 12 for focusing through an aperture 34 in the specimen stage 14 and onto the specimen held thereby. Microscope slide clips 36 are provided in the usual manner to aid in securing a glass slide on the stage on which the specimen is mounted, or a specimen of sufficient length may be mounted directly upon the stage 14. The microscope body 38 defines a light path between the eyepiece 22, threadably secured thereby, and a turret 40 mounted at the bottom thereof carrying the objective lens 18 and two other objective lenses, each of which can be rotated into alignment with the body 38, as is well known in the microscope art. The filter 20 is secured within a slot therefor in the microscope body 38 immediately above the turret 40 and can be changed to provide different filters for blocking different spectral regions of light. Additionally, the microscope body 38 is fitted with the polarizer 26, between the filter 20 and eyepiece 22, as is known, so as to be rotatable from outside the microscope body, as indicated by the arrow 42.

The microscope body 38 is pivotally connected to the microscope stage 14 by means of an arm 44 which is connected to the body 38 so as to extend horizontally therefrom to an elbow 46 and which is formed with two return segments 48 and 50. The return segments 48 and 50 are pivotally connected as a yoke on opposite sides of the specimen stage 14 so that the aperture 34 constitutes the pivotal center of the segments 48 and 50. In the drawing, the outer segment 48 is cut away, for clarity of illustration of the specimen stage 14. The segments 48 and 50 are connected through the specimen stage 14 by means of a yoke pin 52 which is rigidly secured to one of the yoke segments 48 and protrudes through the opposite yoke segment 50. The free end of the yoke pin 52 is threaded and carries a knurled-rim knob 54 threadable thereon and into engagement with the yoke segment 50 to frictionally secure the yoke segments 48 and 50 to the specimen stage at any desired pivotal position, as indicated by the angle 56 in FIG. 1.

A particular laser which is useful herein is a Korad continuous wave repetitively Q-switched laser formed of yttrium aluminum garnet with imbedded neodymium (Nd:YAG). Such a laser generates 10,000 pulses per second at 1064 nm, each of the order of $10^{-4}$ joule and 200 nanosecond duration. The unpolarized output can be polarized by the polarizing means 28 which can be a Glan prism.

As indicated, the laser 10 emits light of 1064 nm wavelength and when passed through a specimen having periodic spatial modulation of its nonlinear susceptibility, a second harmonic of the fundamental frequency is generated, i.e., a wavelength of 532 nm. This second harmonic is green in color and can be viewed through the microscope when appropriately pivoted, wavelengths of the fundamental frequency being blocked by the filter 20. In this regard, it is desirable to provide as much pivoting capability as possible to enable flexibility of use for viewing various samples with different sources of lased light. Generally, the viewing angle is in a range of angles which is at least as broad as 0°-90° and preferably at least as broad as the range 0°-180°. Note that while the specific embodiment illustrated obtains a viewing angle by pivoting the optical path 24 with respect to the specimen stage 14, alternatively, for appropriately cut and mounted crystals, the microscope body 38 can be rigidly mounted to the specimen stage 14 and the condenser and source 10 can be pivoted with respect thereto so as to provide the desired relative angle between the optical path and incident beam. With higher angles the microscope body 38 can be removed and indpendently secured below stage 14 (by means not shown). The mirror 32 can be partially transmitting for viewing therethrough.

In place of the specific laser utilized, one could use any source which will generate lased coherent light of a desired fundamental frequency, or for that matter, a plurality of fundamental frequencies, and which will permit visual observation of a harmonic of the fundamental frequency. Preferably, the light is emitted in a spectral range which will permit visual observation of the second harmonic as the intensity thereof is most usable. Accordingly, it is preferred to use a laser generating light of a fundamental frequency having a wavelength between 800 nm and 1400 nm, yielding light of second harmonic frequency having a wavelength between 400 nm and 700 nm. More preferably, the laser is chosen to generate a fundamental frequency having a wavelength between 980 and 1150 nm to yield a green second harmonic frequency having a wavelength between 490 and 575 nm.

The objective lens is formed of a glass which is inert to coherent lased light of the fundamental frequency and, with respect to the exemplified embodiment, such objectives are known in the field of infrared microscopy. The filter is constituted to pass the second harmonic but is opaque to the fundamental frequency, and infrared-absorptive, but green-transparent filters are known.

In operation, light from the laser 10 is reflected from the mirror 32, passes through the condenser focusing lens 12 to impinge onto the specimen 16 (FIG. 1) supported by the specimen stage 14. The microscope body is tilted on its pivot mount until the diffracted second harmonic is seen through the eyepiece. In such position, the fundamental frequency is blocked by absorbtion by the filter 20, the second harmonic passing therethrough into the eyepiece. Optionally, the polarizer 26 can be rotated to provide increasing or decreasing contrast variations upon rotation. Additionally, a Glan prism 28 can be provided in the path of the lased light to polarize the light prior to impingement upon the specimen and in conjunction with the polarizer 26 there is provided an additional ability to discern details of orientation of microcrystallites that are unavailable from ordinary microscopy. Photographs can be taken of the images through the eyepiece, as known.

Figure 3:
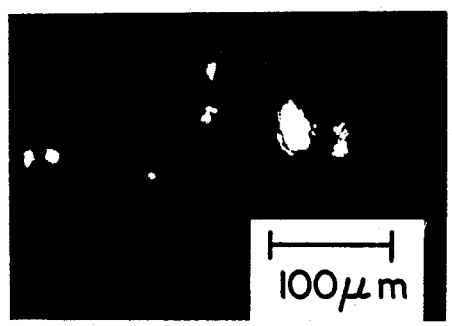
FIGS. 3(a)-(d) are photomicrographs illustrating some of the advantages of the present invention.
Figure 3:
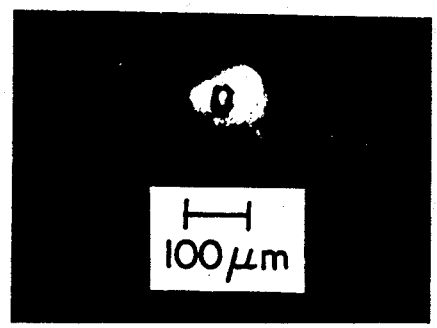
Figure 3:
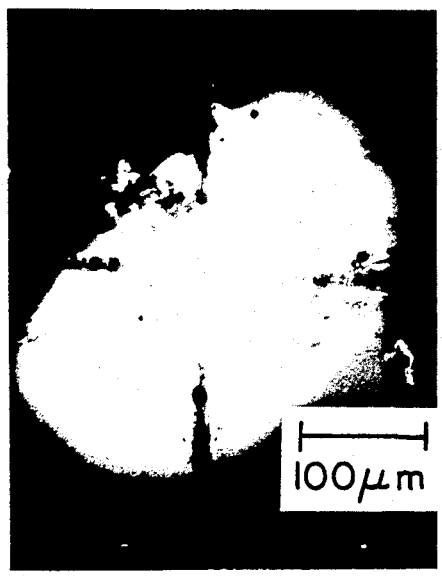
Figure 3:

Referring to FIG. 3a, a photomicrograph is shown of a second harmonic image of the interior of a polycrystalline ZnSe window using a fundamental frequency of 1064 nm whereby the second harmonic frequency observed has a wavelength of 532 nm. The sample was a 2.1 mm thick chemically vapor deposited ZnSe window and as a result of the present observation method, substantial information is obtained about the density, shapes and crystallographic and spacial orientations of the window grains. Phase-matched second harmonic radiation from 1064 nm does not exist in single-crystal ZnSe, since it is optically isotropic and normally dispersive. However, the spacial variations in polycrystalline ZnSe do creat a sort of phase-matching that creates second harmonic light. Variations in material structure, accompanied by variations in the second harmonic nonlinear susceptibility, determine the phase and amplitude of the observed second harmonic light.

Referring to FIG. 3(b), there is shown a photomicrograph of the second harmonic image of an inclusion inside of a gallium arsenide single crystal, also obtained with the Nd-YAG laser above referred-to. Despite the fact that the absorption depth for green light is about 1 micrometer in gallium arsenide, the image appeared to originate in the interior and the microscope had to be focused about ½ millimeter into the interior of the sample in order to see the image. It can be hypothesized that such deep focusing is required because the second harmonic image is generated at the surface of the sample by a mixing of the infrared light scattered by the imperfection with the unscattered indicent beam. This produces a hologram-like reconstruction of the image wavefront, but in the green.

FIGS. 3(c) and (d) further illustrate the holographic-like character of the infrared microscopy mode. Two crossed scratches were made in the surface of a 1 millimeter thick polished slab of CdTe. FIG. 3(c) is a photomicrograph of the scratches as seen directly through an ordinary microscope. FIG. 3(d) is a photomicrograph of a second harmonic iamge of the scratches viewed from the opposite side by placement of the slab with the scratches facing the illuminating laser. Again the microscope had to be focused on the far face of the slab to obtain the image; yet, the details of the scratches can be discerned with much greater clarity in the photomicrograph obtained utilizing the method of examination of the present invention.

It should be understood that while the present invention has been described in considerable detail with respect to certain specific embodiments thereof, it is not to be considered limited to those embodiments, but may be used in other ways without departure from the spirit of the invention or the scope of the appended claims.

What is claimed is:

1. A method for microscopically examining a specimen formed of material which is relatively transparent to a predetermined fundamental frequency and to at least one harmonic of said fundamental frequency, said specimen having spatial modulation of its nonlinear susceptibility whereby to project harmonic light of impinging lased light at an angle which depends at least upon the frequency of said lased light, comprising:

supporting said specimen on a specimen stage of a microscope, said microscope being formed to be optically operational with light of said harmonic frequency and including as its optical system, an objective lens constituted of material which is inert to lased coherent light of said fundamental frequency, an eyepiece, and a body member defining an optical path between said objective lens and said eyepiece;

generating lased, coherent light of at least said fundamental frequency;

thereafter, focusing said lased coherent light as an incident beam onto said specimen to illuminate part of said specimen;

after generating said lased light, adjusting said optical system to focus said microscope on said illuminated part of said specimen and to dispose said optical path and said incident beam at a desired relative angle in a range of angles which is at least as broad as the range 0-90° whereby said optical system produces an image of structure of said specimen defined by a harmonic of said fundamental frequency, said harmonic being produced at said structure; and blocking light of said fundamental frequency from traveling to said eyepiece.

2. The method of claim 1 in which said range of angles is at least as broad as the range 0°-180°.

3. The method of claim 1 in which optical path and incident beams are disposed at said desired relative angle by pivoting said optical path relative to said specimen stage.

4. The method of claim 1 in which said microscope is formed to be optically operational with light of a frequency which is a second harmonic of said fundamental frequency.

5. The method of claim 4 in which light of said fundamental frequency is substantially invisible to the human eye and in which light of said second harmonic frequency is visible to the human eye.

6. The method of claim 5 in which said fundamental frequency has a wavelength between 800 nm and 1400 nm and light of said second harmonic frequency has a wavelength between 400 nm and 700 nm.

7. The method of claim 6 in which light of said fundamental frequency has a wavelength between 980 nm and 1150 nm and light of said second harmonic frequency has a wavelength between 490 nm and 575 nm.

8. The method of claim 1 including the step of disposing a polarizer in said optical path.

9. The method of claim 8 including the step of polarizing said lased light prior to impingement thereof onto said specimen.

* * * * *